(12) United States Patent
Chickering et al.

(10) Patent No.: US 8,627,493 B1
(45) Date of Patent: Jan. 7, 2014

(54) SINGLE SIGN-ON FOR NETWORK APPLICATIONS

(75) Inventors: Roger A. Chickering, Granite Bay, CA (US); Paul Funk, Cambridge, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1192 days.

(21) Appl. No.: 11/970,701

(22) Filed: Jan. 8, 2008

(51) Int. Cl.
*G06F 21/00* (2013.01)

(52) U.S. Cl.
USPC .......... 726/27; 726/3; 726/4; 726/6; 713/156; 713/168; 705/64; 709/224; 709/225

(58) Field of Classification Search
USPC ........................................ 726/3, 27; 713/176
See application file for complete search history.

(56) References Cited

U.S. PATENT DOCUMENTS

| | | | | |
|---|---|---|---|---|
| 6,339,423 | B1* | 1/2002 | Sampson et al. | 715/854 |
| 7,409,705 | B2* | 8/2008 | Ueda et al. | 726/5 |
| 7,454,623 | B2* | 11/2008 | Hardt | 713/182 |
| 7,457,950 | B1* | 11/2008 | Brickell et al. | 713/156 |
| 7,823,192 | B1* | 10/2010 | Fultz et al. | 726/7 |
| 7,836,298 | B2* | 11/2010 | Gross et al. | 713/155 |
| 7,886,341 | B2* | 2/2011 | Lin et al. | 726/4 |
| 7,930,735 | B2* | 4/2011 | Vigelette et al. | 726/6 |
| 2002/0112162 | A1* | 8/2002 | Cocotis et al. | 713/176 |
| 2003/0172090 | A1* | 9/2003 | Asunmaa et al. | 707/200 |
| 2004/0088260 | A1* | 5/2004 | Foster et al. | 705/64 |
| 2006/0059564 | A1* | 3/2006 | Tan et al. | 726/27 |
| 2006/0168645 | A1* | 7/2006 | Song et al. | 726/3 |
| 2006/0179306 | A1* | 8/2006 | Kikkoji et al. | 713/168 |
| 2006/0185021 | A1* | 8/2006 | Dujari et al. | 726/27 |
| 2006/0233166 | A1* | 10/2006 | Bou-Diab et al. | 370/389 |
| 2006/0272011 | A1* | 11/2006 | Ide et al. | 726/5 |
| 2007/0056025 | A1* | 3/2007 | Sachdeva et al. | 726/5 |
| 2007/0220598 | A1* | 9/2007 | Salowey et al. | 726/10 |
| 2007/0255841 | A1* | 11/2007 | Chong | 709/229 |
| 2007/0288634 | A1* | 12/2007 | Nakatsuyama | 709/225 |
| 2008/0046349 | A1* | 2/2008 | Elberg et al. | 705/35 |
| 2008/0178264 | A1* | 7/2008 | Keohane et al. | 726/3 |
| 2009/0150287 | A1* | 6/2009 | Campbell et al. | 705/44 |

OTHER PUBLICATIONS

M. Walla, "Kerberos Explained", Microsoft TechNet, Windows 2000 Advantage, May 2000, http://technet.microsoft.com/en-us/library/bb742516(printer).aspx, 6 pages.

* cited by examiner

Primary Examiner — Morshed Mehedi
(74) Attorney, Agent, or Firm — Harrity & Harrity, LLP

(57) ABSTRACT

A method may include authenticating a device to a first server, where the device includes an agent; receiving a request, in the first server from a second server, to verify the authenticity of the device, where the device is not authenticated to the second server; sending a browser plug-in to the device to communicate with the agent for verifying the authenticity of the device; receiving, in the first server, a message from the agent verifying the authenticity of the device; and sending a message from the first server to the second server to authenticate the device to the second server.

22 Claims, 9 Drawing Sheets

| SESSION TABLE 400 | | | |
|---|---|---|---|
| SESSION ID 402 | USER NAME 404 | USER DEVICE 406 | CHANNEL ID 408 |
| AB | JOE | 104-2 | X |
| AC | JANE | 104-1 | Y |

TOKEN TABLE 500

| TOKEN 502 | SESSION ID 504 | USER NAME 506 | USER DEVICE 508 | TOKEN REC'D FROM AGENT 510 | TOKEN REC'D FROM BROWSER 512 |
|---|---|---|---|---|---|
| T1 |  |  |  | N | N |

TOKEN TABLE 500'

| TOKEN 502 | SESSION ID 504 | USER NAME 506 | USER DEVICE 508 | TOKEN REC'D FROM AGENT 510 | TOKEN REC'D FROM BROWSER 512 |
|---|---|---|---|---|---|
| T1 | AC | JANE | 104-1 | Y | N |

TOKEN TABLE 500"

| TOKEN 502 | SESSION ID 504 | USER NAME 506 | USER DEVICE 508 | TOKEN REC'D FROM AGENT 510 | TOKEN REC'D FROM BROWSER 512 |
|---|---|---|---|---|---|
| T1 | AC | JANE | 104-1 | Y | Y |

520"

600

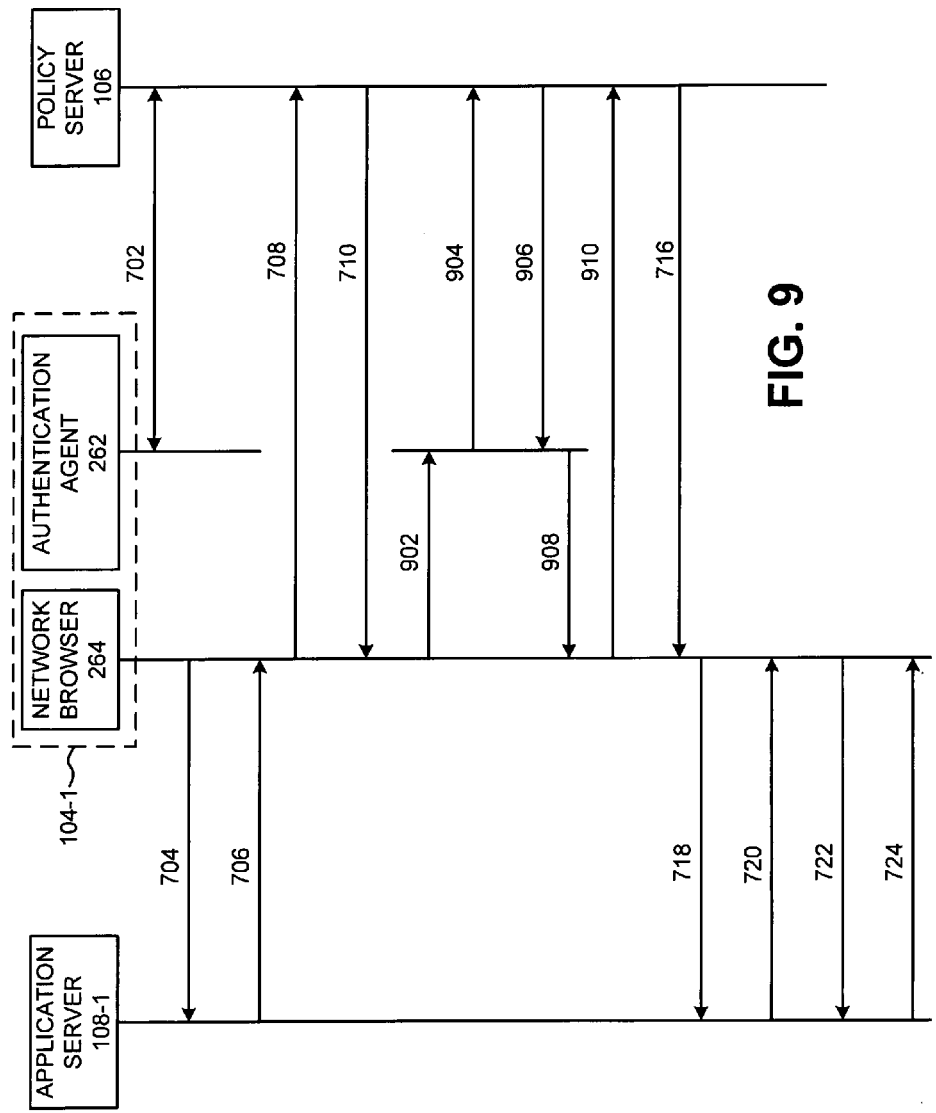

US 8,627,493 B1

SINGLE SIGN-ON FOR NETWORK APPLICATIONS

BACKGROUND

More and more organizations are implementing networks in which users authenticate to a server on the network before acquiring access to network services. Once users have access to network services, users may use that access to use network-based applications such as intranets, web-based email, web-based word processors, database services, document management services, content management services, etc. These network-based applications may restrict access to authorized users, and, in this case, will verify the identity of authorized users.

SUMMARY

A method may include authenticating a device to a first server, where the device includes an agent; receiving a request, in the first server from a second server, to verify the authenticity of the device, where the device is not authenticated to the second server; sending a browser plug-in to the device to communicate with the agent for verifying the authenticity of the device; receiving, in the first server, a message from the agent verifying the authenticity of the device; and sending a message from the first server to the second server to authenticate the device to the second server.

A network device may include a processor to authenticate a user device to the network device, where the user device includes an agent; a receiver to receive a request from a server to authenticate the user device, where the user device is not authenticated to the server; and a transmitter to sent a browser plug-in to the user device to communicate with the agent for verifying the authenticity of the user device with the network device; where the receiver receives a message from the agent verifying the authenticity of the user device; and where the transmitter sends a message from the network device to the server to authenticate the user device to the server.

An apparatus may include means for authenticating a device to a first server, where the device includes an agent; means for receiving a request, in the first server from a second server, to verify the authenticity of the device, where the device is not authenticated to the second server; means for sending executable code to the device to communicate with the agent for verifying the authenticity of the device; means for receiving, in the first server, a message from the agent verifying the authenticity of the device; and means for sending a message from the first server to the second server to authenticate the device to the second server.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 4 is a block diagram of an exemplary session table;

FIGS. 5A, 5B, and 5C are block diagrams of an exemplary token table;

FIG. 9 is a signal diagram of exemplary signals that may be sent between an application server, a user device, and a policy server.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

In organizations that implement 802.1X authentication by endpoints before endpoints can access the network, a policy server in the network may be aware of the identity of the user using an endpoint. After gaining access to the network, users may access servers over the network, for example, to request resources (e.g., services and applications) provided by those servers. For example, a user may want to access a document management database. The user may also want to access benefits information from the corporate human resources web page. These two services may be hosted on separate servers within a corporate network and each server may want to authenticate the user. It may be a hassle, however, for the user to type and re-type her user name, password, etc., over and over again each time the user accesses a different server associated with her corporate network, particularly if the user had already been authenticated over 802.1X by a policy server.

If the user has already authenticated to a server on the network before acquiring access to network services, embodiments described herein may authorize access for the user to network-based application based on the original authentication rather than prompting the user for credentials again when the user attempts to use a network-based application. Embodiments disclosed herein may allow for a user (e.g., a user name or user device) to authenticate with a policy server that may also act as an identity provider. When the user requests resources from an application server (e.g., a service provider), the application server may request that the policy server verify the authenticity of the user. The policy server may validate the authenticity of the user and, as a result, the application server may deliver the resources requested by the user. Thus, in one embodiment, a single sign-on may be used for authentication of a user with multiple application servers.

Exemplary Environment

Figure 1:
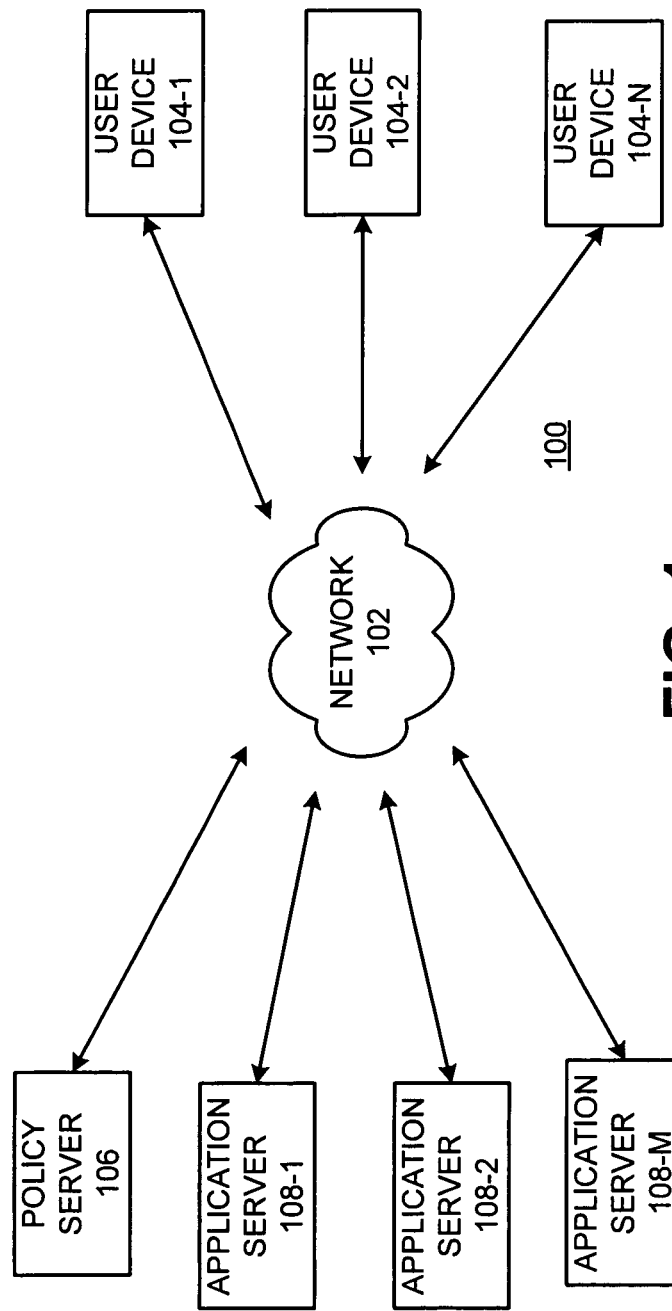
FIG. 1 is a block diagram of an exemplary environment in which systems and methods described herein may be implemented.

FIG. 1 is a block diagram of an exemplary environment 100 that may include a network 102, user devices 104-1 through 104-N (individually "user device 104-x," collectively "user devices 104"), a policy server 106, and application servers 108-1 through 108-M (individually "application server 108-x," collectively "application servers 108"). In practice, there may be more, different, or fewer devices or a different arrangement of devices than what is shown in FIG. 1. For example, environment 100 may include thousands or even millions of user devices 104 (the number of which is denoted in FIG. 1 by N). Environment 100 may also include dozens of application servers 108 (the number of which is denoted in FIG. 1 by M).

Further, while FIG. 1 shows user devices 104, policy server 106, and application servers 108 in environment 100, one or more of these devices may be remotely located from the others, e.g., the devices may be geographically diverse. Although arrows in FIG. 1 may indicate communication between devices and network 102, communication may be direct between devices or indirect through one or more networks. User devices 104, policy server 106, and application servers 108 may be considered "nodes" or "devices" coupled to or located within network 102.

Communication among user devices 104, policy server 106, and application servers 108 may be accomplished via wired and/or wireless communication connections. Network 102 may include a wide-area network (WAN) (e.g., the Internet), a local-area network (either wired or wireless), a telephone network (e.g., the Public Switched Telephone Network (PSTN)), an intranet, a private corporate network, or a combination of networks.

User devices 104 may include computers, telephones, personal digital assistants, or any other communication devices that may transmit or receive data. User devices 104 may include, for example, computers that send and/or receive data through network 102. User devices 104 may also include, for example, telephones that send and/or receive voice conversations, video conferences, etc., through network 102.

Policy server 106 may receive requests, such as authentication, authorization, and/or access requests, from user devices 104 and/or application servers 108. For example, policy server 106 may receive a request from user device 104-x to be authenticated and to establish a session with policy server 106. Policy server 106 may provision authorization and access for user device 104-x after authenticating user device 104-x and may establish a channel for communications between user device 104-x and policy server 106. Policy server 106 may include a RADIUS (Remote Authentication Dial In User Service) server that processes EAP (Extensible Authentication Protocol) messages contained in RADIUS messages received from a network access device, such as a switch or wireless access point, where the user device uses 802.1X to authenticate to the network access device. Policy server 106 may also verify the authenticity of a user device 104-1 when requested by application server 108-x. Policy server 106 may also be referred to as an identity provider.

Application servers 108 may provide application services to user devices 104 (or other nodes) in environment 100. Such services may include document management services, email services, calendar services, instant messaging services, etc. Application servers 108 may send requests to policy server 106 to verify the authenticity of user devices 104 requesting resources in application servers 108. An application server 108-1 may also be referred to as a service provider.

Although application servers 108 are shown as separate devices, in one embodiment, one or more application servers 108 may be virtual machines running in one or more computers. In addition, although policy server 106 is shown separate from application servers 108, in one embodiment, policy server 106 may be a virtual machine running in a computer that may also host other virtual machines, such as one or more application servers 108 implemented as virtual machines.

In one embodiment, application servers 108 and policy server 106 may be part of a common corporate environment, for example. In other words, application servers 108 may provide applications to corporate employees who may be authenticated by policy server 106. In one embodiment, application servers 108 and policy server 106 may be able to communicate in a secure manner with each other, for example, by having shared secrets or a public/private key and certification system. For example, application server 108-1 may be able to receive communication from policy server 106 knowing that the communication is unaltered and from policy server 106 (e.g., not an interloper), and vice versa. In other words, communications or messages from policy server 106 may be verifiable or certifiable when received by application servers 108. In one embodiment, messages from policy server 106 may be verifiable or certifiable by virtue of physical security rather than the use of encryption, etc.

Exemplary User Device

Figure 2:
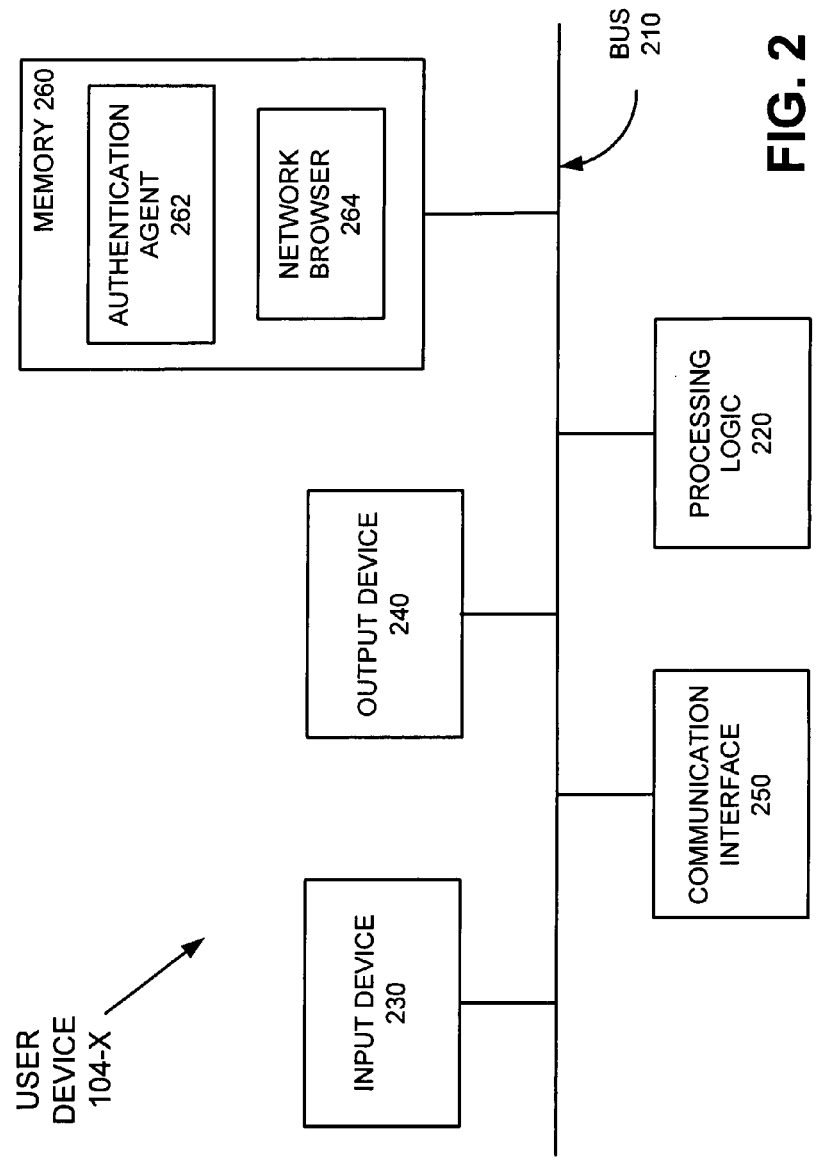
FIG. 2 is a block diagram of exemplary components of a user device.

FIG. 2 is a block diagram of exemplary components of user device 104-x. Device 104-x may include a bus 210, processing logic 220, an input device 230, an output device 240, a communication interface 250, and a memory 260. Device 104-x may include other components (not shown) that aid in receiving, transmitting, and/or processing data. Moreover, other configurations of components in device 104-x are possible. Further, one or more components of device 104-x may be remotely located from the other components.

Bus 210 may include a path that permits communication among the components of device 104-x. Processing logic 220 may include any type of processor or microprocessor (or groups of processors or microprocessors) that interprets and executes instructions. In other embodiments, processing logic 220 may include an application-specific integrated circuit (ASIC), a field-programmable gate array (FPGA), or the like.

Input device 230 may include a device that permits a user to input information into device 104-x, such as a keyboard, a keypad, a mouse, a pen, a microphone, a remote control, a touch-screen display, one or more biometric mechanisms, or the like.

Output device 240 may include a device that outputs information to the user, such as a display, a printer, a speaker, etc. Output device 240 may include a vibrator to alert a user. Input device 230 and output device 240 may allow the user of device 104-x to receive a menu of options. The menu may allow the user to select various functions or services associated with applications executed by device 104-x or other devices coupled to network 102. Input device 230 and output device 240 may allow the user to activate a particular service or application, such as a service or application provided by one of application servers 108-1 or policy server 106.

Communication interface 250 may include any transceiver-like mechanism that enables device 104-x to communicate with other devices and/or systems. Communication interface 250 may include a transmitter that may convert baseband signals from processing logic 220 to radio frequency (RF) signals and/or a receiver that may convert RF signals to baseband signals. Alternatively, communication interface 250 may include a transceiver to perform functions of both a transmitter and a receiver. Communication interface 250 may be coupled to an antenna for transmission and reception of the RF signals. Communication interface 250 may include a network interface card, e.g., Ethernet card, for wired communications or a wireless network interface (e.g., WiFi) card for wireless communications.

Memory 260 may include a random access memory (RAM) or another type of dynamic storage device that may store information and instructions, e.g., an application, for execution by processing logic 220; a read-only memory (ROM) device or another type of static storage device that may store static information and instructions for use by processing logic 220; and/or some other type of magnetic or optical recording medium and its corresponding drive, e.g., a hard disk drive (HDD), for storing information and/or instructions.

Memory 260 may include an authentication agent application 262 ("agent 262") and a network browser application 264 ("browser 264"). Agent 262 may allow for the verification of the digital identity of user device 104-x to another device, such as policy server 106. Agent 262 may include an 802.1X supplicant. Agent 262 may establish sessions with other devices, such as policy server 106. Such sessions may allow for the verifiable and/or secure communication between agent 262 and another device, such as policy server 106. Browser 264 may include a web browser, such as the Mozilla Firefox browser, Epiphany browser, Opera browser, Konquerer browser, Safari browser, Explorer browser, etc. Browser 264 may be any application that may request a universal resource indicator (URI) or a universal resource locater (URL). Other examples of browsers may include a soft phone (e.g., X-Lite or Ekiga), an e-mail reader (e.g., Thunderbird or Outlook), or other programs (e.g., Google Earth). Browser 264 may be able to execute or run plug-ins. A plug-in may include computer language instructions for execution by processing logic 220, for example. A plug-in may include scripted language instructions (e.g., Java, ActiveX, etc.), unscripted language instructions, an applet, or a dynamic link library (DLL). A plug-in may include any other type of executable object or process.

Device 104-x may perform certain operations, as described in detail below. Device 104-x may perform these operations in response to processing logic 220 executing software instructions contained in a computer-readable medium, such as memory 260. A computer-readable medium may be defined as a physical or logical memory device. The software instructions may be read into memory 260 from another computer-readable medium or from another device via communication interface 250. The software instructions contained in memory 260 may cause processing logic 220 to perform processes that are described below.

Exemplary Server Computing Module

Figure 3:
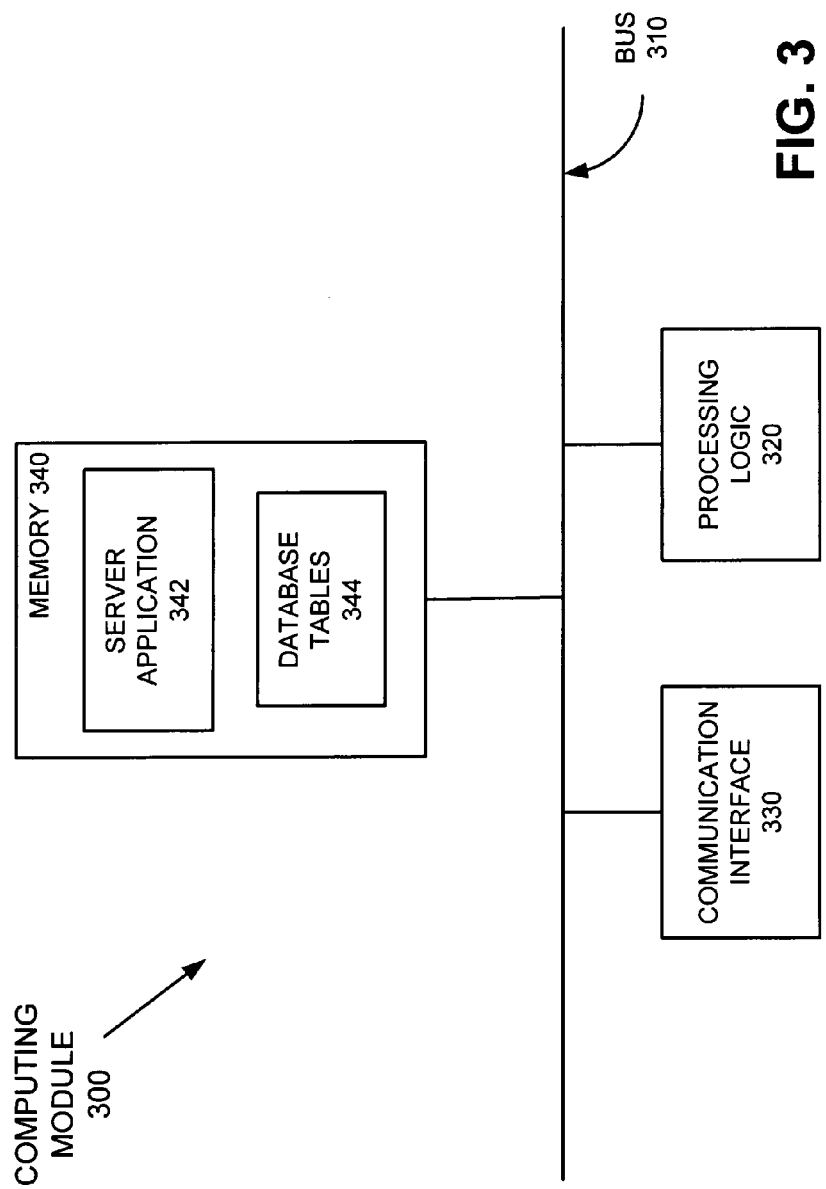
FIG. 3 is a block diagram of exemplary components of a server computing module.

FIG. 3 is a block diagram of exemplary components of a server computing module 300 ("module 300"). Policy server 106 and application servers 108 may each include one or more computing modules 300. That is, policy server 106 and application servers 108 may each include a rack of one or more computing modules, such as computing module 300. Module 300 may include a bus 310, processing logic 320, a communication interface 330, and a memory 340. Module 300 may include other components (not shown) that aid in receiving, transmitting, and/or processing data. Moreover, other configurations of components in module 300 are possible. In addition, policy server 106 and application servers 108 may include other components (not shown) or configurations of components.

Bus 310 may include a path that permits communication among the components of module 300. Processing logic 320 may include any type of processor or microprocessor that interprets and executes instructions. In other embodiments, processing logic 320 may include an ASIC, FPGA, or the like.

Communication interface 330 may include any transceiver-like mechanism (e.g., a receiver/transmitter combination) that enables module 300 to communicate with other devices and/or systems. Communication interface 330 may allow for wired or wireless communications. In one implementation, communication interface 330 may allow for module 300 to be controlled and/or administered remotely by an operator or an administrator.

Memory 340 may include a RAM or another type of dynamic storage device that may store information and instructions for execution by processing logic 320; a ROM device or another type of static storage device that may store static information and instructions for use by processing logic 320; and/or some other type of magnetic or optical recording medium and its corresponding drive for storing information and/or instructions. Memory 340 may store one or more server applications 342 ("server application 342") and database tables 344. In the case of policy server 106, for example, server application 342 may include an authorization, authentication, and/or access application for providing identity services to a network. In the case of application servers 108, server application 342 may include applications such as a web-based document management system, a content management system, a human resources application, etc. Server application 342 may include any other type of application. Server application 342 may include instructions for causing module 300 to implement and provide services and processes described herein. Database tables 344 may include data stored and used by server application 342, for example, for providing the network services described herein.

Module 300 may perform certain operations, as described in detail below. Module 300 may perform these operations in response to processing logic 320 executing software instructions contained in a computer-readable medium, such as memory 340. The software instructions may be read into memory 340 from another computer-readable medium or from another device via communication interface 330. The software instructions contained in memory 340 may cause processing logic 320 to perform processes that are described below.

Exemplary Database Tables

FIG. 4 is a block diagram of an exemplary session table 400. Session table 400 may store information regarding user devices that have established a session with policy server 106. In one embodiment, session table 400 may include authenticated sessions. In one embodiment, session table may include sessions that allow for secure or verifiable communications with policy server 106. Session table 400 may be stored, for example, in memory 340 as one of database tables 344 of computing module 300 in policy server 106. Alternatively, session table 400 or portions of session table 400 may be stored in other devices coupled to network 102, such as in memory 340 of application server 108-1.

Session table 400 may include a session ID field 402, a user name field 404, a user device field 406, and a channel ID field 408. Session table 400 may include additional, different, or fewer fields than illustrated in FIG. 4. The fields shown in FIG. 4 are for exemplary purposes.

Session ID field 402 may include an identifier that may uniquely identify a session established between an authenticated user device, such as any user device 104-x, and policy server 106. In one embodiment, the identifier in session ID field 402 may be a shared secret between policy server 106 and user device 104-x. In exemplary session table 400, there are two session IDs listed in records 420 and 422: AB and AC, respectively.

User name field 404 may include an identifier for the user name associated with the session identified in the corresponding session ID field 402. In exemplary session table 400, there are two user names listed in records 420 and 422: JOE and JANE, respectively. In one embodiment, each user device 104-x may be uniquely identified by a user name.

User device field 406 may include the user device associated with the session identified in the corresponding session ID field 402. In exemplary session table 400, there are two user devices listed in records 420 and 422: user device 104-2 and user device 104-1, respectively.

Channel ID field 408 may include an identifier that may uniquely identify a channel used by policy server 106 to communicate with an authenticated user device, such as any user device 104-x. The channel ID may be established during authentication of user device 104-x. In exemplary session table 400, there are two channels listed in records 420 and 422: channel X and Y, respectively.

In sum, as shown in session table 400, policy server 106 may communicate with user name JOE (who is using device 104-2) over channel X for session AB. Policy server 106 may also communicate with user name JANE (who is using device 104-1) over channel Y for session AC. In one embodiment, a channel may be a logical channel (as opposed to a physical channel) and may be determined by information in packets.

FIGS. 5A, 5B, and 5C are block diagrams of an exemplary token table 500 at three different points in time. Token table 500 may store information regarding tokens used by policy server 106 to respond to verification of authenticity requests. Token table 500 may be stored, for example, in memory 340 as one of database tables 344 of computing module 300 in policy server 106. Token table 500 or portions of token table 500 may be stored in other devices coupled to network 102, such as in a memory of application server 108-1.

Token table 500 may include a token field 502, a session ID field 504, a user name field 506, a user device field 508, a token received from agent field 510, and a token received from browser field 512. Token table 400 may include additional, different, or fewer fields than illustrated in FIG. 4. The fields shown in FIG. 4 are for exemplary purposes.

Token field 502 may include one or more identifiers, each of which may uniquely identify an authentication verification request from an application server, such as any one of application servers 108. For example, application server 108-1 may request verification from policy server 106 of an authentication when user device 104-1 requests a resource. In addition, application server 108-2 may request verification from policy server 106 of an authentication when user device 104-1 requests a resource from application server 108-2. Authentication verification requests are described in more detail below with respect to FIG. 6.

Session ID field 504 may include the session ID that is associated with the token in corresponding token field 502. Session ID field 504 may be empty at times if policy server 106 does not know the session ID that is associated with the token in corresponding token field 502. For example, token table 500 of FIG. 5A does not list a session ID in field 504 of record 520. As described below, policy server 106 may determine the session ID based on the channel over which a token was received.

User name field 506 may include the user name that is associated with the token in corresponding token field 502. User name field 506 may be empty at times if policy server 106 does not know the user name that is associated with the token in corresponding token field 502. For example, token table 500 of FIG. 5A does not list a user name in field 506 of record 520. As described below, policy server 106 may determine the user name based on the channel over which a token was received.

User device field 508 may include an identifier for a user device that is associated with the token in corresponding token field 502. User device field 508 may be empty at times if policy server 106 does not know the user device that is associated with the token in corresponding token field 502. For example, token table 500 of FIG. 5A does not list a user device in field 508 of record 520. As described below, policy server 106 may determine the user device identity based on the channel over which a token was received.

As mentioned, policy server 106 may determine the user device, user name, and session ID based on the channel over which a token was received. For example, policy server 106 may receive token T1 over channel Y. Referencing session table 400 (e.g., record 422), policy server 106 may determine that channel Y is associated with session ID AC, user name JANE, and device 104-1. Thus, policy server 106 may enter AC, JANE, and 104-1 into session ID field 504, user name field 506, and user device field 508, respectively.

Token received from agent field 510 may include a value indicating whether policy server 106 received the token from an authentication agent, such as agent 262. Token received from browser field 512 may include a value indicting whether policy server 106 received the token from a browser, such as browser 264 of user device 104-x. Token received from agent field 510 and token received from browser field 512 are described in more detail below with respect to FIG. 8.

Exemplary Processing

Figure 6:
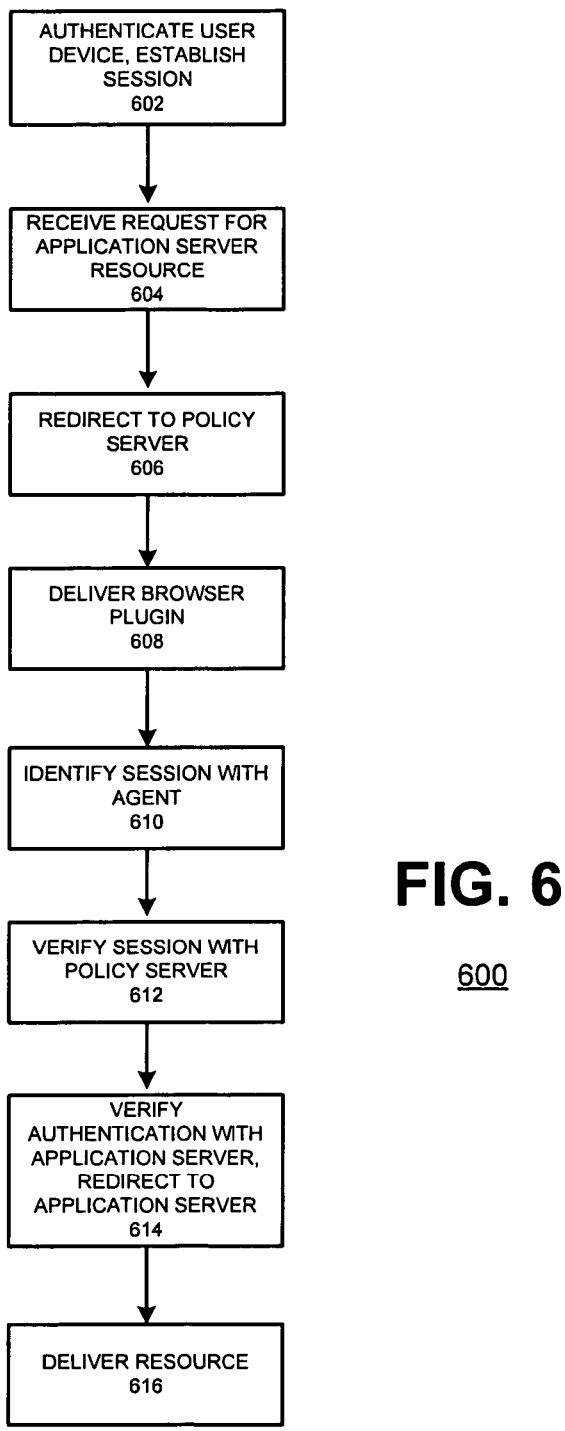
FIG. 6 is a flowchart of an exemplary process for verifying the authenticity of a user device.
Figure 7:
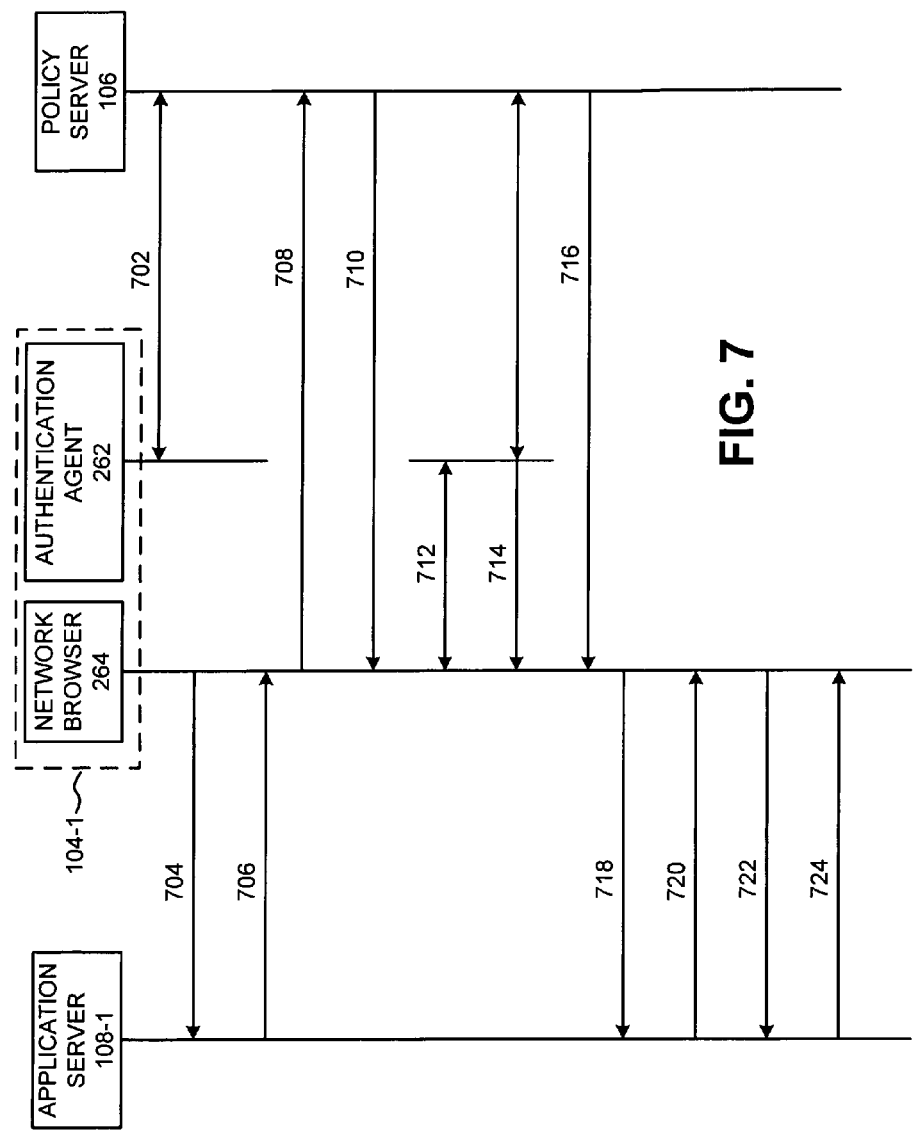
FIG. 7 is a signal diagram of exemplary signals that may be sent between an application server, a user device, and a policy server.

FIG. 6 is a flowchart of an exemplary process 600 for verifying the authenticity of a user device, such as user device 104-1. Process 600 is described with respect to FIG. 7. FIG. 7 is a signal diagram of exemplary signals that may be sent between an application server, a user device, and a policy server, such as application server 108-1, user device 104-1, and policy server 106.

Process 600 may begin when a user authenticates a user device to a policy server and establishes a session (block 602). For example, a user with a user name JANE may want to authenticate user device 104-1 with policy server 106 so that she may be able to access the network, e.g., any one of application servers 108-1 through 108-M. Policy server 106 may authenticate user device 104-1 using any number of authentication protocols including, for example, 802.1X/RADIUS or IKE (Internet Key Exchange). User device 104-1 may establish a secure control channel with policy server 106 using any number of protocols, including, for example, the Transport Layer Security (TLS) protocol, the Secure Sockets Layer (SSL) protocol, etc. The secure channel may be maintained throughout the duration of a session between user device 104-1 and policy server 106, and enables agent 262 and policy server 106 to securely exchange information regarding the session. In one embodiment, the user of device 104-1 with user name JANE may be required to type in a user name, password, and/or enter a pass code from a security fob or mobile phone. In one embodiment, user device 104-1 and policy server 106 may perform certificate-based authentication.

The user of device 104-1 may use agent 262 to communicate with policy server 106 for authenticating and establishing the secure control channel. As shown in FIG. 7, signals 702 may pass between agent 262 of user device 104-1 and policy server 106 for authenticating and establishing the control channel. Establishing a control channel means that policy server 106 may be able to receive communication from agent 262 knowing that the communication is unaltered and actually originated from agent 262 (e.g., not an interloper). In other words, communications or messages from agent 262 may be verifiable or certifiable. As such, authenticating and establishing a control channel may be considered authenticating agent 262 to policy server 106 and establishing a control channel between agent 262 and policy server 106. The control channel established may include a communication channel between policy server 106 and agent 262 with a channel ID and a session ID. A session between agent 262 and policy server 106 begins when agent 262 authenticates to policy server 106 and continues for a period of time determined by policy server 262, agent 262, and the user operating user device 104-1.

Policy server 106 may create a new record in session table 400, such as record 424 for user name JANE. As shown in FIG. 4, record 424 may have a session ID field 402 of AC corresponding to a user name of JANE in user name field 404 and a channel ID of Y in channel ID field 408. In one embodiment, session ID (e.g., AC) may be a shared secret between agent 262 and policy server 106.

A request for a server resource may be received (block 604). As shown in FIG. 7, signal 704 may pass from browser 264 (in user device 104-1) to application server 108-1 requesting a server resource. Signal 704 may be a URI or a URL, for example, associated with a resource relating to benefits information, such as retirement account balances. Application server 108-1, however, may not trust request signal 704 purporting to come from an authenticated user name and user device (e.g., JANE using device 104-1) because application server 108-1 may not have been privy to the authentication that took place between agent 262 and policy server 106 in signals 702.

The request for the server resource may be redirected to a policy server (block 606). In the current example, because application server 108-1 may not trust the request signal 704, application server 108-1 may redirect browser 264 to policy server 106. As shown in FIG. 7, signal 706 may be a redirection signal, which may be passed by browser 264 to policy server 106 as signal 708. Redirection signal 706 may include a request by application server 108-1 to verify the authenticity of user device 104-1. In one embodiment, the request for verification may be encrypted or signed by application server 108-1.

A browser plug-in may be delivered (block 608). Having received signal 708, policy server 106 may recognize the signal as a request by application server 108-1 to verify the authenticity of user device 104-1. Policy server 106 may respond to browser 264 by delivering a plug-in to browser 264. As shown in FIG. 7, signal 710 may include a plug-in being sent from policy server 106 to browser 264.

The session may be identified (block 610). As shown in FIG. 7, browser 264 (using the plug-in) may communicate (using signals 712) with agent 262 to identify the session established for user device 104-1. The session may be identified using, for example, the session ID, channel ID, the user name of device 104-1, or the identity of user device 104-1 itself.

The session may be verified with the policy server (block 612). As shown in FIG. 7, signals 714 may pass between browser 264, agent 262, and policy server 106 such that policy server 106 verifies that user device 104-1 has indeed been authenticated and has established a session with policy server 106. For example, agent 262 may use the secure communication channel established at block 602 to verify the authenticity of user device 104-1 with policy server 106. One embodiment of blocks 610 and 612 are described below with respect to FIGS. 8 and 9.

The session may be verified with the application server and the user device may be redirected to the application server (block 614). Although policy server 106 may have verified the authenticity of user device 104-1 (e.g., that user device 104-1 established a session), policy server 106 may verify this to application server 108-1 (as requested by application server 108-1). As shown in FIG. 7, policy server 106 may send a verification message (signal 716) to browser 264. Verification message (signal 716) may include a Security Assertion Markup Language (SAML) message, which is a standard for exchanging security authentication and authorization messages between devices, such as policy server 106 and application server 108-1. Verification message (signal 716) may include a SAML Assertion and/or a SAML Artifact, for example. The verification message (signal 716) may be forwarded to application server 108-1 (signal 718). The verification message may include information such as the user name (e.g., JANE), identification of the user device (e.g., user device 104-1), time of authentication, authorization privileges, credentials used for authentication, etc. In one embodiment, verification messages (signals 716 and 718) may include verified, certified, and/or encrypted information. Application server 108-1 may thus verify that browser 264 that sent resource request signal 704 indeed has established a session with policy server 106 and can be trusted.

The requested resources may be delivered (block 616). Having been satisfied of the authenticity of user device 104-1, application server 108-1 may provide the resources requested in signal 704. As shown in FIG. 7, the verification message (signal 718) forwarded to application server 108-1 may include information regarding the requested resources of the original request (e.g., signal 704). Application server 108-1 may redirect browser 264 (using signal 720) to the originally requested resources. Through this redirection, browser 264 may re-request the resources of signal 704 in signal 722. As shown in FIG. 7, the originally requested resources may be delivered in signal 724. Further, application server 108-1 may send a cookie to browser 264 so that application server 108-1 may verify the authenticity of user device 104-1 in the future without the intervention of policy server 106.

Figure 8:
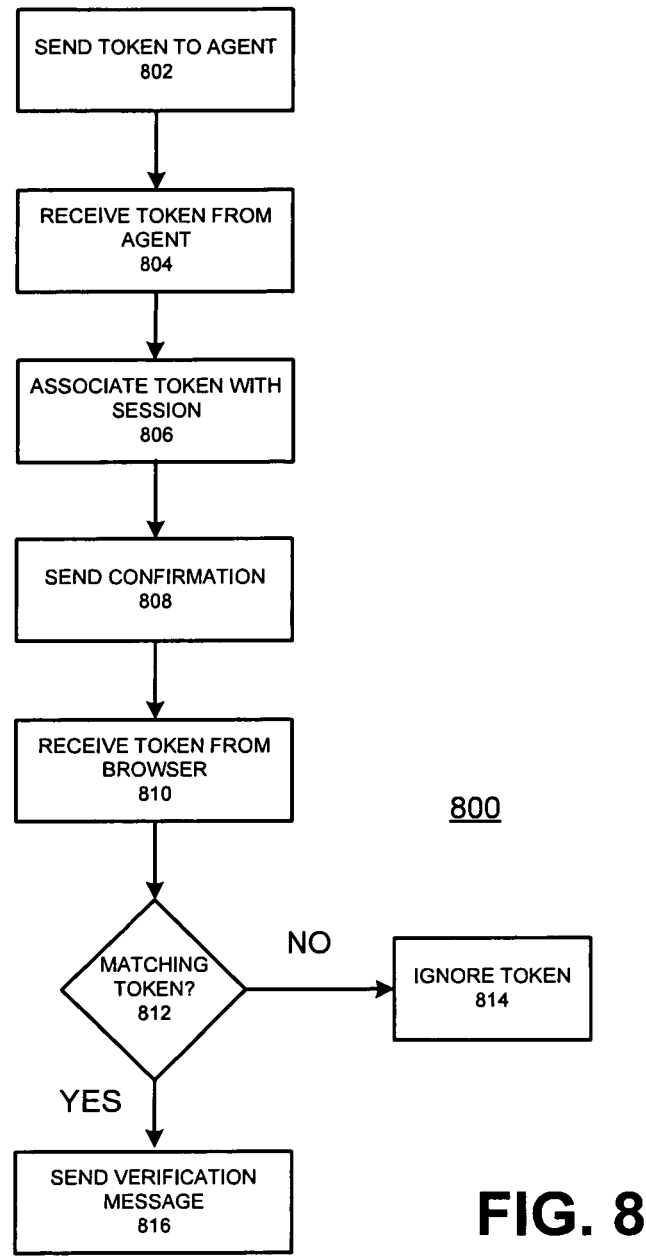
FIG. 8 is a flowchart of another exemplary process for verifying the authenticity of a user device.

FIG. 8 is a flowchart of an exemplary process 800 for verifying the authenticity of a user device, such as user device 104-1. Process 800 is described with respect to FIG. 9. FIG. 9 is a signal diagram of exemplary signals that may be sent between application server 108-1, user device 104-1 (including network browser 264 and agent 262), and policy server 106. Signals 702 through 710 and signals 716 through 724, shown in FIG. 9, may be the same or similar to those signals shown in FIG. 7 and described above. In one embodiment, signals 712 and 714, described above, may be supplemented or replaced by signals 902 through 910 described below.

As discussed above with respect to block 608, policy server 106 may send a plug-in to browser 264 using signal 710. In one embodiment, the plug-in may include a token. As described above with respect to FIGS. 5A, 5B, and 5C, the token may uniquely identify an authentication verification request, such as the verification request in signal 708. In this example, policy server 106 may create record 520 in token table 500 that includes information regarding the token (e.g., token T1) sent with the plug-in to browser 264. Policy server 106 may leave session ID field 504 and user name field 506 blank because policy server 106 may not know, during the creation of record 520, the session ID or the user name to associated with the corresponding token, e.g., token T1.

A token may be sent to the agent (block 902). Browser 264, having just received a plug-in for communicating with agent 262, may send the token (e.g., token T1) to agent 262. As shown in FIG. 9, browser 264 may send token T1 to agent 262 using signal 902. The token may be received by the policy server from the agent (block 804). As shown in FIG. 9, agent 262 may send token T1 to policy server 106 using signal 904 over channel Y—the channel previously established between user device 104-1 and policy server 106 during the authentication (block 602) that took place using signals 702. Because the token may be sent over channel Y, the token is part of a verifiable message from agent 262 to policy server 106.

The token may be associated with a session (block 806). For example, having received token T1 from agent 262 over channel Y, policy server 106 may reference session table 400, which associates channel Y with session AC, user name JANE, and user device 104-1. As shown in FIG. 5B, policy server 106 may enter session ID of AC in session ID field 504, user name JANE in user name field 506, and user device 104-1 in user device field 508 of record 520 in token table 500'. Associating a token with a session may allow policy server 106 to receive many verification requests from application servers 108, where each request may receive its own token. Each token, e.g., each request, may then be associated with a session in session table 400.

Confirmation of receipt of the token in the policy server may be sent (block 808). Policy server 106 may send a confirmation to agent 262 that the token T1 was successfully received in policy server 106. Agent 262 may instruct the plug-in running in browser 264 to send the token T1 to policy server 106.

The token may be received by the policy server (block 810) from the browser. Policy server 106 may receive token T1. Policy server 106 may reference token table 500 to determine if there are any matching tokens. In this example, there is a matching token in record 520. Policy server 106 may indicate in field 512, shown in token table 500", that a matching token was received.

If the token received in policy server 106 from browser 264 matches the token received from agent 262 (block 812: YES), then a verification message (signal 716) may be sent (block 816) by policy server 106. If the token received in policy server 106 from browser is not the same as the token received from agent 262 (block 812: NO), then the token may be ignored (block 814) and a verification message (signal 716) may not be sent. The comparison that takes place in block 812 may help prevent denial of service (DOS) attacks by malicious browser plug-ins that send tokens to policy server 106, which may then issue a flood of bogus verification messages to application servers 108. At block 816, process 800 may proceed to block 614 of process 600.

CONCLUSION

Embodiments disclosed herein may allow for a user to authenticate with a policy server. When the user requests resources from an application server, the application server may request that the policy server verify the authenticity of the user. The policy server may validate the authenticity of the user and, as a result, the application server may deliver the resources requested by the user. Thus, in one embodiment, a single sign-on may be used for authentication of a user with multiple application servers.

It will be apparent that aspects, as described above, may be implemented in many different forms of software, firmware, and hardware in the implementations illustrated in the figures. The actual software code or specialized control hardware used to implement these aspects is not limiting of the present invention. Thus, the operation and behavior of the aspects were described without reference to the specific software code—it being understood that software or control hardware could be designed to implement the aspects based on the description herein.

Further, although the processes described above, including process 600 and 800, may indicate a certain order of blocks, the blocks in these figures may be configured in any order.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a hardware processor to:
transmit an authentication request to a first server prior to transmitting a request for a resource to a second server, the first server being a policy server;
receive, based on the transmitted authentication request, an authentication response from the first server indicating authentication of the device to the first server;
transmit a request for the resource to the second server;
receive, from the second server and based on the transmitted request for the resource, a redirection signal that includes a request for verification of the device; and
transmit the redirection signal to the first server for verification;
receive, from the first server, one or more commands based on transmitting the redirection signal;
receive, from the first server, a plug-in;
use the received one or more commands and the received plug-in to identify a session associated with the device;
receive, from the first server, a verification message based on the identified session;
transmit the verification message to the second server;
cause the session to be established; and
receive, based on causing the session to be established, the requested resource from the second server after the verification message is transmitted to the second server.

2. The device of claim 1, where the processor is further to:
transmit a Markup Language Assertion or a Markup Language Artifact to the first server to authenticate the device to the first server.

3. The device of claim 1, where the processor is further to:
receive the authentication response from the first server over a secure communication channel; and
associate the communication channel with the device.

4. The device of claim 1, where the processor is further to:
receive one or more of a password or a user name; and
authenticate the device based on one or more of the received password or the received user name.

5. The device of claim 1, where the processor is further to:
associate information indicative of the request with the device.

6. The device of claim 1, where the plug-in is a browser plug-in.

7. The device of claim 6, where the browser plug-in includes a token that uniquely identifies the authentication request.

8. A non-transitory computer-readable medium storing instructions, the instructions comprising:
   one or more instructions which, when executed by at least one processor, cause the at least one processor to transmit authentication information to a first server prior to transmitting a request for a resource to a second server, the first server being a policy server;
   one or more instructions which, when executed by the at least one processor, cause the at least one processor to receive an authentication response from the first server;
   one or more instructions which, when executed by the at least one processor, cause the at least one processor to authenticate a device based on receiving the authentication response, the device including an agent;
   one or more instructions which, when executed by the at least one processor, cause the at least one processor to transmit the request for the resource to the second server;
   one or more instructions which, when executed by the at least one processor, cause the at least one processor to receive a request from the second server to verify the authenticity of the device;
   one or more instructions which, when executed by the at least one processor, cause the at least one processor to transmit the request from the second server to the first server;
   one or more instructions which, when executed by the at least one processor, cause the at least one processor to receive, from the first server, a plug-in;
   one or more instructions which, when executed by the at least one processor, cause the at least one processor to communicate with the agent for verifying the authenticity of the device;
   one or more instructions which, when executed by the at least one processor, cause the at least one processor to receive a message from the agent verifying the authenticity of the device;
   one or more instructions which, when executed by the at least one processor, cause the at least one processor to transmit information verifying the authenticity of the device to the first server;
   one or more instructions which, when executed by the at least one processor, cause the at least one processor to receive a verification message, based on the transmitted information verifying the authenticity of the device, from the first server,
   the verification message being received after the plug-in;
   one or more instructions which, when executed by the at least one processor, cause the at least one processor to send the verification message to the second server to authenticate the device to the second server;
   one or more instructions which, when executed by the at least one processor, cause the at least one processor to establish a session with the agent; and
   one or more instructions which, when executed by the at least one processor, cause the at least one processor to receive, based on establishing the session, the requested resource from the second server.

9. The non-transitory computer-readable medium of claim 8, further comprising:
   one or more instructions which, when executed by the at least one processor, cause the at least one processor to establish a communication channel with the agent; and
   one or more instructions which, when executed by the at least one processor, cause the at least one processor to establish the session with the agent using the communication channel.

10. The non-transitory computer-readable medium of claim 9, where the one or more instructions to receive the message from the agent verifying the authenticity of the device include:
    one or more instructions to receive the message from the agent over the communication channel, and where the instructions further comprise:
    one or more instructions which, when executed by the at least one processor, cause the at least one processor to verify the authenticity of the device by associating the communication channel with one or more of the device or the session.

11. The non-transitory computer-readable medium of claim 9, further comprising:
    one or more instructions which, when executed by the at least one processor, cause the at least one processor to send, to the agent, information indicative of the request;
    one or more instructions which, when executed by the at least one processor, cause the at least one processor to receive, from the agent and through the communication channel, the information indicative of the request; and
    one or more instructions which, when executed by the at least one processor, cause the at least one processor to associate the information indicative of the request with one or more of the device or the session.

12. The non-transitory computer-readable medium of claim 8, where the one or more instructions to send the message to the second server to authenticate the device to the second server include:
    one or more instructions which, when executed by the at least one processor, cause the at least one processor to send another message to the device, the other message to be forwarded from the device to the second server.

13. The non-transitory computer-readable medium of claim 8, where the plug-in includes a token that uniquely identifies the request from the second server.

14. A method implemented by a device, the method comprising:
    transmitting, by the device and prior to transmitting a request for a resource to a second server, an authentication request to a first server, the first server being a policy server;
    receiving, by the device and based on the transmitted authentication request, an authentication response from the first server;
    transmitting, by the device, the request for the resource to the second server;
    receiving, by the device and from the second server based on the transmitted request for the resource, a redirection signal that includes a request for verification of the device, the redirection signal being intended for the first server;
    transmitting, by the device, the redirection signal to the first server;
    receiving, by the device and from the first server, instructions based on transmitting the redirection signal;
    receiving, by the device and from the first server, a plug-in;
    using, by the device, the received instructions and the received plug-in to identify a session associated with the device;
    receiving, by the device and from the first server, a verification message based on the identified session;

transmitting, by the device, the verification message to the second server;
establishing, by the device, the session; and
receiving, by the device and based on establishing the session, the requested resource from the second server.

15. The method of claim 14, where the plug-in is received by a browser of the device and transmitted to an agent of the device.

16. The method of claim 15, further comprising:
identifying, by the browser of the device, the session using at least one of a session ID or a channel ID.

17. The method of claim 14, where the verification message includes at least one of:
a user name associated with the device,
an identification of the device,
a time of authentication of the device,
authorization privileges of the device, or
credentials used for authentication.

18. The method of claim 14, further comprising:
transmitting, by the device and to the second server, a second request for the resource; and
receiving, by the device and based on the second request, the requested resource from the second server.

19. The method of claim 14, where the device is authenticated to the first server using 802.1X.

20. The method of claim 14, where, when transmitting the verification message to the second server, the method further includes:
transmitting one or more of a Markup Language Assertion or a Markup Language Artifact.

21. The method of claim 15, further comprising:
establishing, by the device, a verifiable communication channel to the first server; and
transmitting, by the agent of the device, the redirection signal to the first server over the verifiable communication channel to verify the device.

22. The method of claim 14, where the device is authenticated to the first server by one or more of a password or a user name.

* * * * *